F. KAMMERER.
MANUFACTURE OF SOLDER CORED WIRE.
APPLICATION FILED FEB. 27, 1911.

1,109,423.

Patented Sept. 1, 1914.

Witnesses.

The Inventor:
Friedrich Kammerer
by his Attorney

UNITED STATES PATENT OFFICE.

FRIEDRICH KAMMERER, OF PFORZHEIM, GERMANY.

MANUFACTURE OF SOLDER-CORED WIRE.

1,109,423.  Specification of Letters Patent.  Patented Sept. 1, 1914.

Application filed February 27, 1911. Serial No. 611,168.

*To all whom it may concern:*

Be it known that I, FRIEDRICH KAMMERER, a citizen of Baden, residing at Pforzheim, in Germany, have invented a certain new and useful Improvement in the Manufacture of Solder-Cored Wire, of which the following is a specification.

This invention relates to wire for use in the manufacture of jewelry and the like, provided with an annular core of solder placed around a tough central core to enable joints to be made by melting the solder while ends of the wire are held together. In using wire of this kind certain disadvantages have been found to arise from lack of a firm connection between the solder and the tough central core. The solder is liable to be torn and become detached, frequently rendering the wire useless for the purpose indicated.

The object of the present invention is to remove this disadvantage, and the invention substantially consists in uniting the layer of solder to the internal tough core by melting, so as to make a firm joint between them.

The invention is illustrated in the accompanying drawing, in which:—

Figure 1:
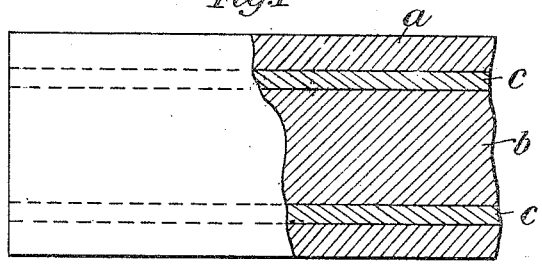
Figure 2:
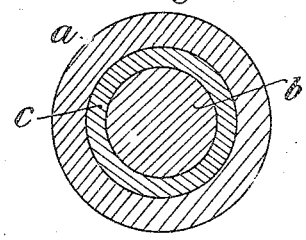
Figure 3:
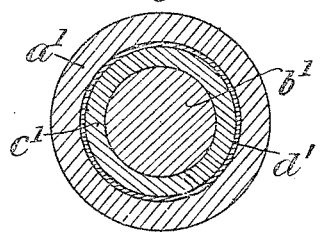

Figure 1 is a side-view of a piece of the wire, much enlarged, and partly in section, Fig. 2 being a cross-section thereof. Fig. 3 is a cross section, showing the preferred construction.

Referring in the first place to Figs. 1 and 2, $a$ is the outer layer or sheath, which may be of gold or silver or consist of a base metal with a superficial layer of gold or silver, $b$ the tough inner core, and $c$ the annular layer of solder between same, the solder $c$ being united to the core $b$, by melting as already stated. The core is tougher and more ductile than the outer layer and the solder, and may, for example, consist of tombac, which is a kind of brass formed of an alloy of copper, zinc and tin. The melting of the solder may be effected by passing the core $b$ with the solder layer thereon through gas flames forcibly blown thereon, the wire being continuously rotated and axially moved, so that the solder melts on the surface of the core and firmly unites therewith.

In the form shown in Fig. 3 a layer of tombac or the like $d^1$ is placed around the solder $c^1$, between the latter and the jacket $a^1$. This shell $d^1$ protects the solder from touch by hand, during insertion into the sheath or other manipulation, and also facilitates the operation of uniting the core and solder by melting, enabling the same to be performed, by heating, after insertion into the sheath. By this heating the solder is melted and united to the core $b^1$ and shell $d^1$. The shell $d^1$ does not form a neutral zone between the sheath and solder.

The breaking and tearing out of the solder is rendered practically impossible by the adherence of the solder to the inner core and to the layer of the same material (when such is used) produced by the method of melting the solder as above described.

What I claim as my invention and desire to secure by Letters Patent of the United States is:—

1. Composite wire for the purpose set forth comprising a core, a massive layer of solder surrounding said core and united therewith by melting, and an external metal sheath.

2. Composite wire for the purpose set forth comprising a metal sheath, a central core, a massive layer of solder surrounding said core and united therewith by melting, and a layer of metal tougher than said sheath between the latter and said massive layer of solder.

3. The method of producing composite wire which consists in forming a core, surrounding said core with a massive layer of solder, uniting said solder layer with said core by melting, inserting said core and solder layer into a metal sheath, and reducing the ingot thus prepared to wire.

In witness whereof I have signed this specification in the presence of two witnesses.

FRIEDRICH KAMMERER.

Witnesses:
A. O. TITTMANN,
S. H. SHANK.